United States Patent
Steinmetz et al.

(10) Patent No.: US 12,228,235 B1
(45) Date of Patent: Feb. 18, 2025

(54) METHODS AND INSPECTION DETECTABLE COMPOSITE REPAIR MATERIALS FOR PIPELINE REPAIRS

(71) Applicants: Luke Dewight Steinmetz, Hot Springs, SD (US); Ronald Ryan Raphoon, Spring, TX (US); Robert H. Hrabe, Rapid City, SD (US)

(72) Inventors: Luke Dewight Steinmetz, Hot Springs, SD (US); Ronald Ryan Raphoon, Spring, TX (US); Robert H. Hrabe, Rapid City, SD (US)

( * ) Notice: Subject to any disclaimer, the term of this patent is extended or adjusted under 35 U.S.C. 154(b) by 210 days.

(21) Appl. No.: 17/968,859

(22) Filed: Oct. 19, 2022

Related U.S. Application Data (60) Provisional application No. 63/361,257, filed on Dec. 10, 2021.

(51) Int. Cl.
| | |
|---|---|
| *F16L 55/175* | (2006.01) |
| *C23C 24/04* | (2006.01) |
| *F16L 55/168* | (2006.01) |
| *F16L 58/02* | (2006.01) |

(52) U.S. Cl.
CPC ............ *F16L 55/175* (2013.01); *C23C 24/04* (2013.01); *F16L 55/1686* (2013.01); *F16L 58/02* (2013.01)

(58) Field of Classification Search
CPC ..... F16L 55/175; F16L 55/1686; F16L 58/02; F16L 58/04; F16L 58/08; F16L 2101/30; C23C 24/04; B23P 6/00; B23P 6/02; B23P 6/04; B05D 1/12; B05D 7/14; B05D 7/146; B22F 2998/00; B22F 2998/10; B29C 73/00; B29C 73/02; B29C 73/025; B29C 73/10

USPC ......... 156/60, 64, 71, 94, 98, 153, 184, 185, 156/187, 191, 192, 195, 272.2, 272.4, 156/276, 278, 279, 280, 281, 297, 298; 138/97, 98, 99; 427/180, 189, 190, 191, 427/421.1, 427, 140, 142

See application file for complete search history.

(56) References Cited

U.S. PATENT DOCUMENTS

| | | |
|---|---|---|
| 5,632,307 A | 5/1997 | Fawley |
| 7,367,488 B2 * | 5/2008 | Payne ..................... C23C 24/04 |
| | | 427/140 |
| 7,938,146 B2 | 5/2011 | Brooks |
| (Continued) | | |

*Primary Examiner* — Philip C Tucker
*Assistant Examiner* — Brian R Slawski
(74) *Attorney, Agent, or Firm* — Jeffrey A. Proehl; Woods, Fuller, Shultz & Smith, PC (57) ABSTRACT

Methods of providing an inspection detectable repair to a component may include providing a component to be repaired having a substrate with a surface. The methods may include identifying a compromised region of a compromised portion of the substrate of the component, with the compromised region having at least one void, and providing material to form a filler material to be applied to the surface of the substrate to be repaired. The methods may include applying particles of filler material as a cold spray deposition utilizing a cold spray deposition apparatus, with particles of filler material forming a deposit of cold sprayed particles on the surface of the substrate adjacent to the at least one void. The methods may include wrapping the substrate of the component with at least one layer of wrap material to cover at least a portion of the deposit of filler material on the substrate.

21 Claims, 8 Drawing Sheets

(56) References Cited

U.S. PATENT DOCUMENTS

| | | | | |
|---|---|---|---|---|
| 8,187,720 | B2* | 5/2012 | Choi | G21C 19/40 |
| | | | | 148/403 |
| 8,424,571 | B2 | 4/2013 | Brooks | |
| 8,709,548 | B1* | 4/2014 | Newbery | C22C 1/0425 |
| | | | | 438/102 |
| 2006/0272724 | A1 | 12/2006 | Borland | |
| 2010/0147409 | A1 | 6/2010 | Lu | |
| 2014/0263853 | A1* | 9/2014 | Jackson | B32B 15/011 |
| | | | | 428/553 |

* cited by examiner

```
PROVIDING A COMPONENT FORMED BY A SUBSTRATE WITH A SURFACE
```

```
INSPECTING THE COMPONENT TO LOCATE
ANY COMPROMISED PORTIONS OF THE SUBSTRATE
```

```
IDENTIFYING A COMPROMISED REGION OF
THE SUBSTRATE WITH AT LEAST ONE VOID ON THE SURFACE
```

```
PROVIDING AT LEAST ONE MATERIAL SUITABLE FOR
COLD SPRAY DEPOSITION AS FILLER MATERIAL FOR THE VOID
```

```
PREPARING THE SURFACE OF THE COMPROMISED REGION
OF THE SUBSTRATE FOR COLD SPRAY PARTICLE DEPOSITION
```

```
APPLYING THE PARTICLES OF THE DEPOSIT MATERIAL TO
THE SUBSTRATE USING A COLD SPRAY DEPOSITION APPARATUS
TO FORM A DEPOSIT OF THE FILLER MATERIAL IN THE VOID
```

```
(OPTIONALLY) EXTENDING THE APPLICATION OF MATERIAL
TO ADDITIONAL REGIONS OF THE SURFACE OF THE SUBSTRATE
```

```
PERFORMING ANY FURTHER TREATMENT OF
THE SUBSTRATE SURFACE AND SURFACE OF THE DEPOSIT
```

```
WRAPPING THE DEPOSIT AND THE COMPROMISED
PORTION OF THE SUBSTRATE WITH A WRAP MATERIAL
```

FIG. 7

METHODS AND INSPECTION DETECTABLE COMPOSITE REPAIR MATERIALS FOR PIPELINE REPAIRS

REFERENCE TO RELATED APPLICATIONS

This application claims the priority benefit of U.S. Provisional Patent Application No. 63/361,257, filed Dec. 10, 2021, the entirety of which is hereby incorporated by reference.

BACKGROUND

Field

The present disclosure relates to pipe repair methods and materials and more particularly pertains to a new methods and inspection detectable composite repair materials for pipeline repairs for facilitating inspection of repaired components such as pipes.

Description of the Prior Art

The use of composite materials as a mechanism to repair and reinforce metallic substrates has been in practice for decades. Over the years the technology has advanced primarily by changing the makeup of the fibers that wrap around the substrate or by altering the orientation of the fibers. In the underground pipeline industry, the means of identifying defective pipelines has been through the use of In-line Inspection (ILI) tools, sometimes referred to as "intelligent" or "smart" pigs. These tools are used to inspect pipelines for evidence of various conditions, such as internal or external corrosion, deformations, laminations, cracks, or other defects. Magnetic Flux Leakage (MFL) and Ultrasonic Testing (UT) are the two primary technologies for in-line inspection of pipelines. Another type of inspection technology uses Acoustic Resonance Technology (ART) which works by emitting a wideband acoustic waveform toward the pipe wall. These inspection technologies may generate a visualization of the pipe wall and provide information on locations at which the inspected pipe has anomalies which may require repair.

After ILI tools have identified an anomaly to be repaired, and the compromised portions of the pipe are identified, methods of repair typically involve excavating soil from around the underground pipeline to expose the compromised portions of the pipe. Any corrosion protection material present may be removed and the surface of the pipeline may be cleaned. The defect or damage to the pipe may produce a void or voids in the surface of the pipe in the form of, for example, gouges, dents and corrosion pitting.

One highly suitable repair technique involves the filling of the void or voids on the surface of the pipe with a resin-based filler material and then the affected portions of the pipe may subsequently be wrapped with multiple layers of reinforcing fabric combined with an adhesive which cures and hardens. The pressure load from the contents carried by the pipeline and imposed on the filler material of the repair may be transferred to the layers of the composite fibers of the wrap, and the composite of the filler material and wrap has the capability of restoring the pipe to its original strength. This repair technique may be used to reinforce and repair straight, bent, or custom shaped portions of a pipeline.

Alternatives to the repair technique utilizing the filler material and layer wrap include, for example, the installation of metal clamps about the defective or damaged portion of the pipe, or the removal of the damaged pipe portion and replacement of the damaged pipe portion with a new pipe portion or a pipe fitting. These repair techniques have a number of disadvantages as compared to the filler material and layer wrap repair technique that make them significantly less desirable in comparison.

The repair technique utilizing the filler material and layer wrap has been employed in multiple ways by various manufacturers, and the industry has developed standard practices and testing methods for utilization of composite pipe repair methods. The American standard is ASME PCC-2 Repair of Pressure Equipment and Piping, and the international standard is ISO 24817 Petroleum, petrochemical and natural gas industries-Composite repairs for pipework-Qualification and design, installation, testing and inspection. The two standards nearly mirror each other in content in terms of how to design and test a composite repair.

In general, the aspects of the repair techniques governed by the standards have eight components or steps which are outlined, for example, in PCC-2 Article 4.1 of the ASTM standard. These aspects generally include qualification and testing to be completed, and more specifically the aspects include the following:
  1. Substrate
  2. Surface preparation
  3. Filler Material
  4. Primer
  5. Interlaminar Adhesives
  6. Composite Laminate
  7. Application Method
  8. Curing Protocol Following the steps and testing protocols and utilizing the filler material and layer wrap technique has proven to be very effective in repairing pipelines and typically results in very high safety factors, which often leads to the repaired area of the pipe outperforming the substrate of the unrepaired portions of the pipe under pressurized loads.

However, despite the success achieved with this particular repair technique in remedying defects and damage to the pipe, when ILI inspections are performed on the pipe after the repair has been completed, the portions of the pipe that have been repaired using this technique typically still appear to have a defect or damage and need repair because the inspection technologies typically utilize some form of magnetism or acoustic measurement and do not detect the presence of the filler material.

For example, the filler material of the repair technique cannot be effectively identified by magnetic inspection technologies because the repair materials are non ferrous fillers that cannot be detected by measurement of the magnetic characteristics of the repaired portion of the pipe. As a further example, inspection technologies which employ acoustics cannot effectively detect the presence of the filler materials either, because the repair materials are substantially different in composition and characteristics from the material of the pipe substrate.

As a result of the repair being essentially invisible to the aforementioned ILI inspection technologies, pipeline operators have dispatched resources to excavate and expose and inspect portions of pipelines to repair defects which previously were repaired using the filler material and wrap layer technique, leading to wasted and misdirected resources the cost of which may reach into the tens of thousands of dollars. With the current pipe repair techniques and inspection technologies, this problem is likely to continue with ever increasing waste of time, money, and resources.

SUMMARY

In one aspect, the present disclosure relates to a method of providing an inspection detectable repair to a component. The method may comprise providing a component to be repaired, with the component comprising a substrate having a surface. The component may be elongated in a longitudinal direction with a perimeter wall extending longitudinally about a lumen. The method may include identifying a compromised region of a compromised portion of the substrate of the component, with the compromised region having at least one void on the surface and extending into the substrate. The method may include providing at least one material to form a filler material to be applied to the surface of the substrate to be repaired, and applying particles of the filler material as a cold spray deposition utilizing a cold spray deposition apparatus. Particles of the filler material may form a deposit of cold sprayed particles on the surface of the substrate adjacent to the at least one void. The method may include wrapping the substrate of the component with at least one layer of wrap material to cover at least a portion of the deposit of the filler material on the substrate.

In another aspect, the disclosure relates to a method of providing an inspection detectable repair to a pipe which may include providing a pipe to be repaired, with the pipe comprising a substrate having an outer surface, and being elongated in a longitudinal direction with a perimeter wall extending longitudinally about a lumen. The method may also include inspecting the pipe to locate a compromised portion of the substrate utilizing an inspection device configured to detect defects or damage in the perimeter wall of the substrate, and identifying a compromised region of the outer surface on the compromised portion of the substrate of the component, with the compromised region having at least one void on the surface and extending into the substrate. The method may also include providing at least one material to form a filler material to be applied to the outer surface of the substrate to be repaired, applying particles of the filler material as a cold spray deposition utilizing a cold spray deposition apparatus, particles of the filler material forming a deposit of cold sprayed particles on the outer surface of the substrate adjacent to the at least one void, and wrapping the substrate of the component with at least one layer of wrap material to cover at least a portion of the deposit of the filler material on the substrate.

In a further aspect, the disclosure relates to a repaired component which may comprise a substrate having a surface, and the component may be elongated in a longitudinal direction with a perimeter wall extending longitudinally about a lumen. The surface of the substrate may have a compromised region with at least one void on the surface and extending into the substrate. The component may also include a deposit on the surface of the substrate adjacent to the at least one void, with the deposit comprising a filler material of particles applied to the surface by cold spray deposition utilizing a cold spray deposition apparatus. The component may also include at least one layer of wrap material covering at least a portion of the deposit of the filler material on the substrate.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components. and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 7 thereof, new methods and inspection detectable composite repair materials for pipeline repairs embodying the principles and concepts of the disclosed subject matter will be described.

The applicants have recognized that a highly suitable solution to the problems surrounding the ability to effectively inspect pipes by detecting repairs made utilizing the filler material and layer wrap technique would involve the utilization of a filler material with characteristics which more closely resemble or approximate characteristics of the substrate material of the pipe previously repaired.

In particular, the applicants have recognized the value of a repair in which the filler material or materials utilized in the repair can be detected by inspection technologies which sense pipe characteristics using magnetic and/or acoustic energy so that the filler material of the repair is indistinguishable (or substantially indistinguishable) from the original pipe substrate material around the repair to the inspection apparatus. As such, the existence of the repair may not be perceptible as a repair using the inspection technologies, and may appear to those performing the inspection remotely using the aforementioned techniques as never having been damaged or repaired. Stated somewhat differently, the material used in the repair may be detected, the repair itself may not be detectable. In some cases, the filler material of the repair may be detectable to a degree which indicates a repair to defect or damage in the substrate.

To provide some or all of the advantages set forth above, the applicants have developed a filler material for filling areas of defect or damage on a portion of a pipe, and methods of repairing the portion of the pipe, which utilize a technology referred to as cold spray particle deposition technology, or supersonic particle deposition technology, in which particles of the powdered material are sprayed or projected onto a surface at a very high velocity such that the particles have a high degree of energy and become adhered to the surface through a combination of mechanical interlocking and metallurgical bonding (from re-crystallization at highly strained particle interfaces) to form a coating of the solid-state or consolidated particles of the powdered material.

The powdered material applied through cold spray particle deposition technology may advantageously include metals, metal alloys, and metal blends suitable for numerous pipe substrate applications. The particles of the powder to be deposited are solid prior to spraying, and remain solid during the spray application process, and are solid on the surface of the substrate as soon as deposited on the substrate. Notably, resinous filler materials have a flowable, such as viscous or even liquid, state prior to and immediately after application to the substrate, usually until the resin has set up through a chemical reaction.

Cold spray deposition application typically employs a heated high-pressure carrier gas to accelerate the particles of powders to move through a supersonic de Laval nozzle above a critical velocity for particle adhesion to a surface, such as the surface of the substrate.

The implementation of cold spray particle deposition into the technology of pipeline repair offers several advantages in the context of the repair of a pipe substrate. For example, cold spray particle deposition requires a very low heat input as the deposition of the particles on the substrate occurs primarily through a mechanical mechanism, and as a result no appreciable heat is generated in the pipe substrate that often creates a "heat-affected zone" in the substrate which may negatively affect the characteristics of the substrate.

Furthermore, the use of cold spray particle deposition to apply the filler material places no significant limit on the thickness of the material deposited on the substrate, does not result in the formation of oxides on the substrate, decomposition of the alloy of the substrate, or entrapment of combustion products in the deposited filler material. Also, cold spray particle deposition typically preserves the microstructure and properties of the powder particles deposited, and further produces residual stresses in the filler material that are compressive rather than tensile.

In contrast, repair techniques utilizing welding of the pipe generate an extremely high degree of heat in the pipe substrate which may produce a heat affected zone in the substrate and also can produce a hazard in pipelines that carry flammable materials when operational. Welding on the pipe substrate may also lead to formation of oxides on the substrate, decomposition of the alloy of the substrate, and possibly the entrapment of combustion products in the welded filler material.

Generally, cold spray particle deposition exhibits a high degree of deposit efficiency, which is often greater than 80% of the particles sprayed, bond strengths between the filler material and the substrate of greater than 10 ksi (68 MPa), coating strengths between the particles of the filler material of greater than 40 ksi (275 MPa), and porosity in the deposited filler material may be below approximately 1 percent.

As a result of the utilization of cold spray particle deposition to place the filler material on the pipe substrate, in-line inspection (ILI) of the pipe using conventional technologies is much more likely to detect the filler material utilized in the repair of the defect or damage, and as the filler material of the repair may resemble the characteristics of the pipe substrate, evidence of the repair may be very difficult or even virtually impossible to detect using ILI technologies.

Another advantageous aspect of the utilization of cold spray particle deposition technology as the filler material is the resistance to corrosion exhibited by the materials utilized for the particles of the cold spray powder such that, if the layers of wrap were compromised, corrosion would be resisted. Further, even if corrosion of the material applied by cold spray deposition were to occur, future ILI is likely to reveal the occurrence of corrosion which is not necessarily possible in the case of the use of previously-utilized filler materials.

A further advantage of the application of cold spray particle deposition technology to pipeline repair include the restoration of the repaired portion of the pipeline to the original level (or even greater level) of burst strength on a consistent and reliable basis, and potentially improving future resistance to further structural deterioration of the pipeline caused by corrosion or external damage. Cold spray particle deposition of the filler material to the substrate of the pipe is also sufficiently simple such that the process can be performed in a cost efficient manner on a pipeline, while also minimizing the down time of the pipeline during repair and/or rehabilitation.

In some aspects, the methods of the disclosure relate to aspects of repairing a component, such as the pipe of a pipeline, and in some aspects may extend to inspecting the component to identify defects or damage prior to and/or after a repair of the component is made.

Figure 1A:
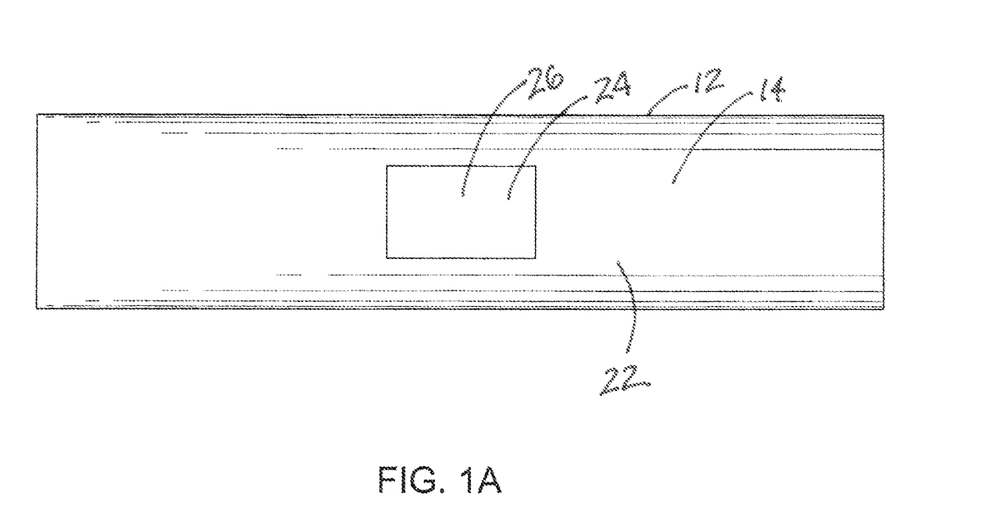
FIG. 1A is a schematic top view of a component, illustrated as a compromised portion of a pipe, showing a compromised region of the pipe with a void to be repaired, according to an illustrative implementations of the disclosure.
Figure 1B:
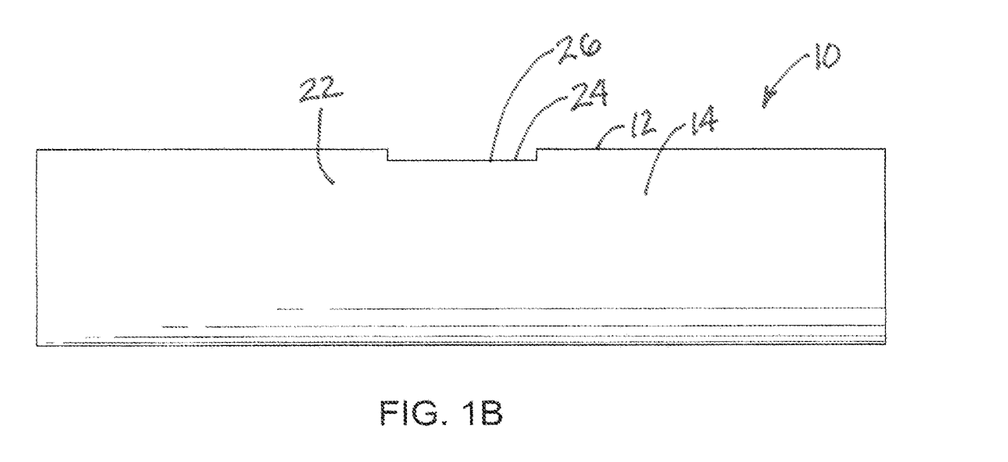
FIG. 1B is a schematic side view of the compromised portion of the pipe of FIG. 1A, also showing the compromised region of the pipe with the void to be repaired, according to an illustrative implementation of the disclosure.

Methods of the disclosure may include providing a component 10 which may be subject to inspections for determining any need for repair of the component which may have resulted from defects or damage or other circumstances compromising the component. In illustrative implementations, the component 10 may have defects or damages that require repair, but the scope of the disclosure is not so limited and may extend to implementations in which, for example, reinforcement of a portion of the component which would benefit from reinforcement but is not necessarily defective or damaged at the point of utilization of the methods on the component. In the illustrative implementations of this disclosure, the component will be described as being a pipe, and forming a portion of the pipe being a portion of a pipeline utilized to carry a transport a gas and/or a liquid under pressure. It will be recognized that aspects of the disclosure may be utilized on other types of components, such as components with structures which extend in a longitudinal direction and have an internal hollow space which extends in the longitudinal direction, and which may be exposed to a force directed radially outward against the component from the space. Examples of such components may include storage drums, pressure tanks, and canisters.

Illustrative embodiments of the component 10 may include a substrate 12 which primarily forms the component and has a surface 14. The surface 14 may be an outer surface, such as the outer surface of a pipe, but is not necessarily limited to being an outer surface and may comprise an inner surface. The component 10 may define a space or lumen 16 internal to the component which may be defined or bounded by the inner surface. The outer surface may be located opposite of the lumen 16, and the inner surface. For the purposes of this description, the surface 14 comprises the outer surface of the component, but it should be understood that the surface 14 could comprise the inner surface.

The substrate 12 may form a perimeter wall 18 of the component that surrounds the lumen 16. In illustrative embodiments, the perimeter wall 18 may be tubular in a longitudinal direction 20, and typically, although not necessarily, the tubular perimeter wall may be substantially cylindrical in shape. The perimeter wall 18 may be continuous in a lateral cross section of the longitudinally-elongated component 10.

Aspects of the method may include inspecting, or conducting an inspection of, the component 10 to locate any compromised portions 22 of the substrate 12 of the component that may exist. Inspection of the component may include moving an inspection device with respect to the substrate 12, and the inspection device may utilize one of the inspection technologies discussed in this disclosure or another technology. Movement of the inspection device may include translating the inspection device in the lumen of the component, such as in the longitudinal direction 20. Inspection of the component 10 may reveal, for example, a defect in the substrate which may have existed in the component from the time of manufacture or placement of the component into service, and/or damage to the substrate which may have arisen from conditions such as corrosion of the material forming the substrate, forces acting externally with respect to the component or forces acting internally with respect to the component, as well as other conditions.

Inspecting the component may proceed and lead to identifying a compromised region 24 on the surface 12 of the compromised portion 22 of the substrate 12 of the component. Typically, the compromised region 24 may have at least one void 26 on the surface 14 which may extend into the substrate 12 to some degree, effectively decreasing the thickness of the perimeter wall 18 at the location of the void as compared to the thickness of the wall 18 at a majority of locations on the wall. The void or voids 26 may be produced by defect or damage to the substrate involving, for example, material loss from the substrate to produce a localized thinning of the thickness of the wall 18. The void or voids 26 may be produced by damage to the substrate involving corrosion of the material of the substrate which may contribute to pitting in the surface of the component, or may be produced by impact to the outer surface of the substrate which causes the material loss or weakening.

Implementation of a repair of the component utilizing aspects of the disclosure may include providing at least one material 28 to form the particles of the powder of the filler material to be utilized through cold spray particle deposition for repairing the substrate.

Selection of the one or more materials 28 for the filler material may include identifying a material or materials that are compatible with the material forming the substrate, so that material incompatibility can be avoided. Typically, the one or more materials 28 may be selected based upon the selected material having characteristics similar to the material of the substrate such that the material of the filler material facilitates identification of the filler material as forming a portion of the perimeter wall 18 with the material of the substrate 12 during, for example, inspections of the component such as in line inspections (ILI).

In some of implementations, the selected material or materials of the filler material may comprise an alloy, and may include a ferrous material. Further, the selected material or materials may comprise a high compression material.

Further implementation of the method may include preparing the surface 14 of the substrate for being repaired, and may exposing the surface of the substrate. In a broad sense, and in the context of buried components such as pipelines or tanks, exposing the surface of the substrate may include excavating earth positioned above the component in the ground to provide access to the compromised portion or portions 22 of the component. In a somewhat narrower sense, exposing the surface may include clearing any substances on the surface 14 of the substrate from the surface, such as cleaning the surface of dirt and debris and other substances foreign to the materials forming the substrate. Further, in some implementations, the substrate 12 may be provided with treatment of the surface 14 in a manner that is likely to promote bonding of the filler material with the material of the substrate.

Figure 2:
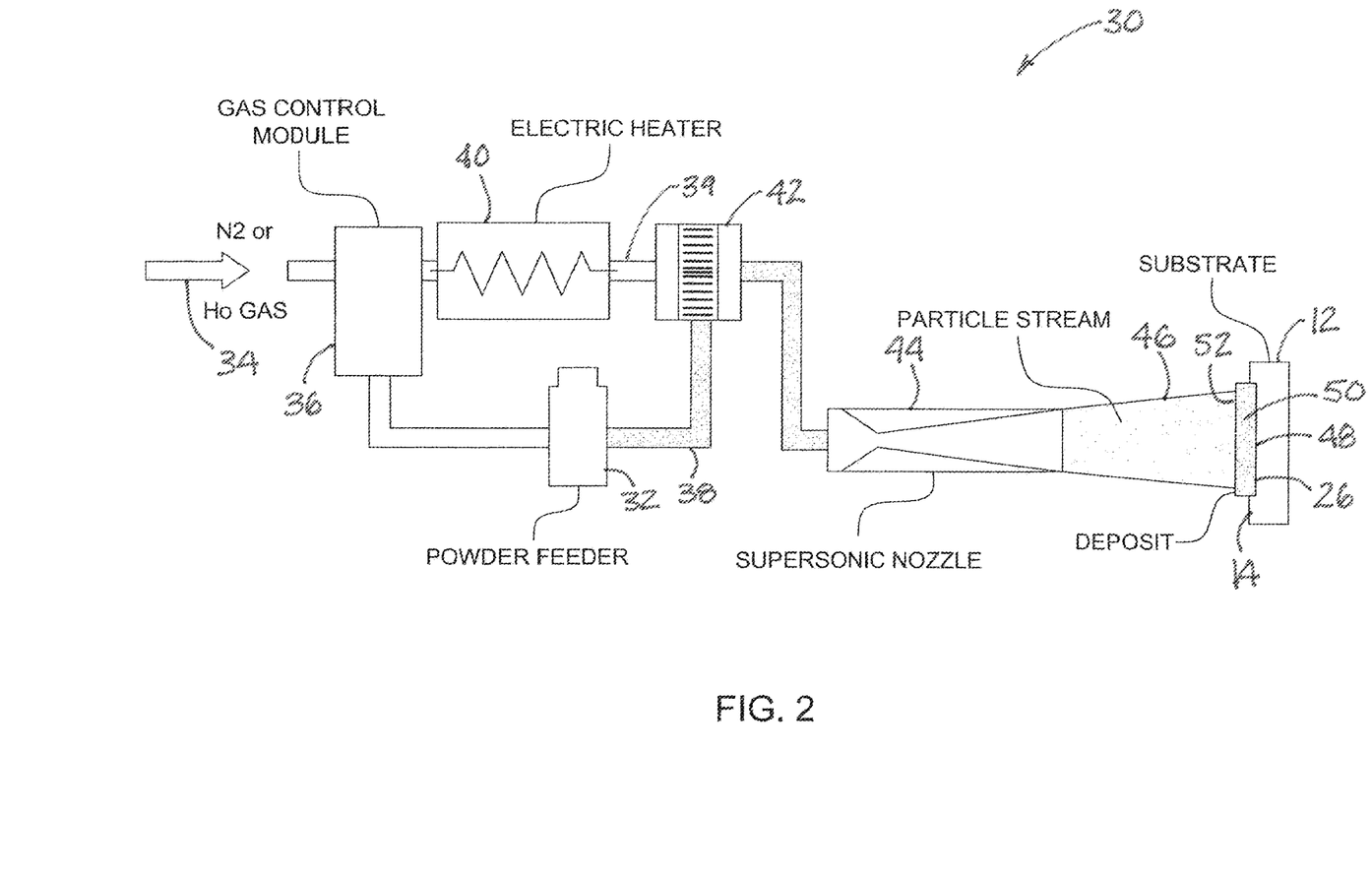
FIG. 2 is a schematic diagram of an illustrative cold spray particle deposition apparatus, according to an illustrative embodiment of the disclosure.

One of the more significant aspects of the methods of the disclosure is the application of the particles of the powder of the filler material by utilizing cold spray deposition techniques via a cold spray deposition apparatus 30 which produces cold spray deposited particles as filler material on the substrate, such as in the one or more voids 26 in the substrate and on the surface 14 of the substrate material. Application using the cold spray deposition technique may include placing the particles of powder of the filler material into a hopper of a powder feeder 32 of the apparatus 30.

The methods may further include utilizing a pressurized gas flow to spray the particles of powder from the cold spray deposition apparatus 30, and the gas may originate from a gas source 34. The gas source 34 may provide a suitable gas for the material being deposited via the cold spray, and may include, for example, nitrogen and helium The gas from the gas source may be passed through a gas control module 36 which may direct one flow 38 of the gas to the powder feeder 32 to entrain powder particles in the flow of gas, as well as directing another flow 39 of the gas to a gas heater 40 for heating the gas prior to introduction of the particles of powder in the one gas flow into the heated gas of the another gas flow. The gas flows 38, 39 may be rejoined together at a manifold 42 and the combined gas flow may be delivered to a nozzle 44 which dispenses a stream 46 of the cold sprayed particles of the powder of the filler material. The nozzle 44 is most suitably a supersonic de Laval nozzle, and accelerates the sprayed particles to a speed above the critical velocity for particle adhesion to the surface 14. Typically, although not necessarily, the nozzle 44 is formed as a part of a gun 45 which may be handheld to facilitate movement of the area 48 of impact of the particles on the substrate.

Figure 3A:
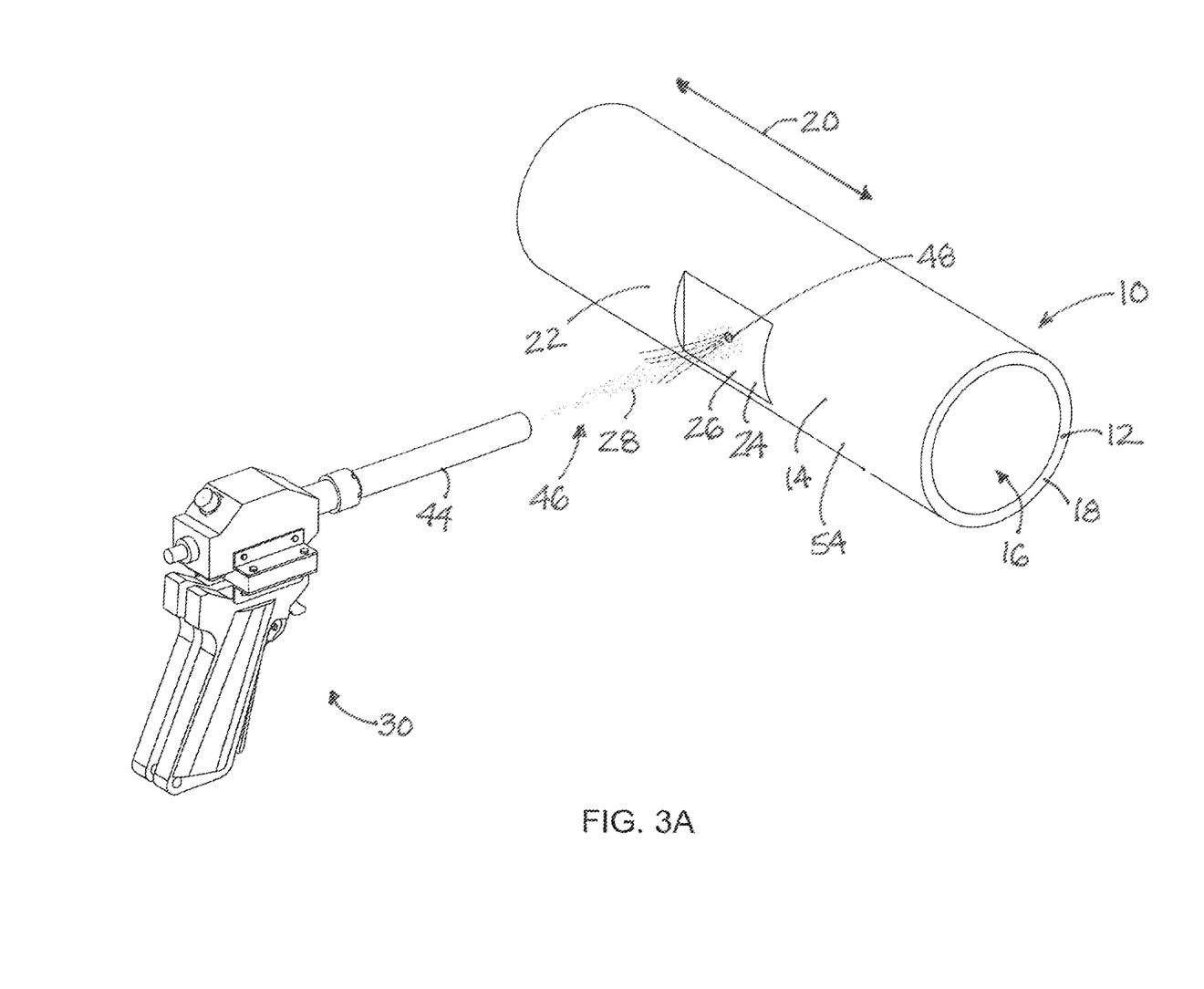
FIG. 3A is a schematic illustration of the nozzle of a cold spray particle deposition apparatus spraying particles of a powder to impact the void of the compromised region of the surface of the compromise portion of the pipe, according to an illustrative implementation of the disclosure.
Figure 3B:
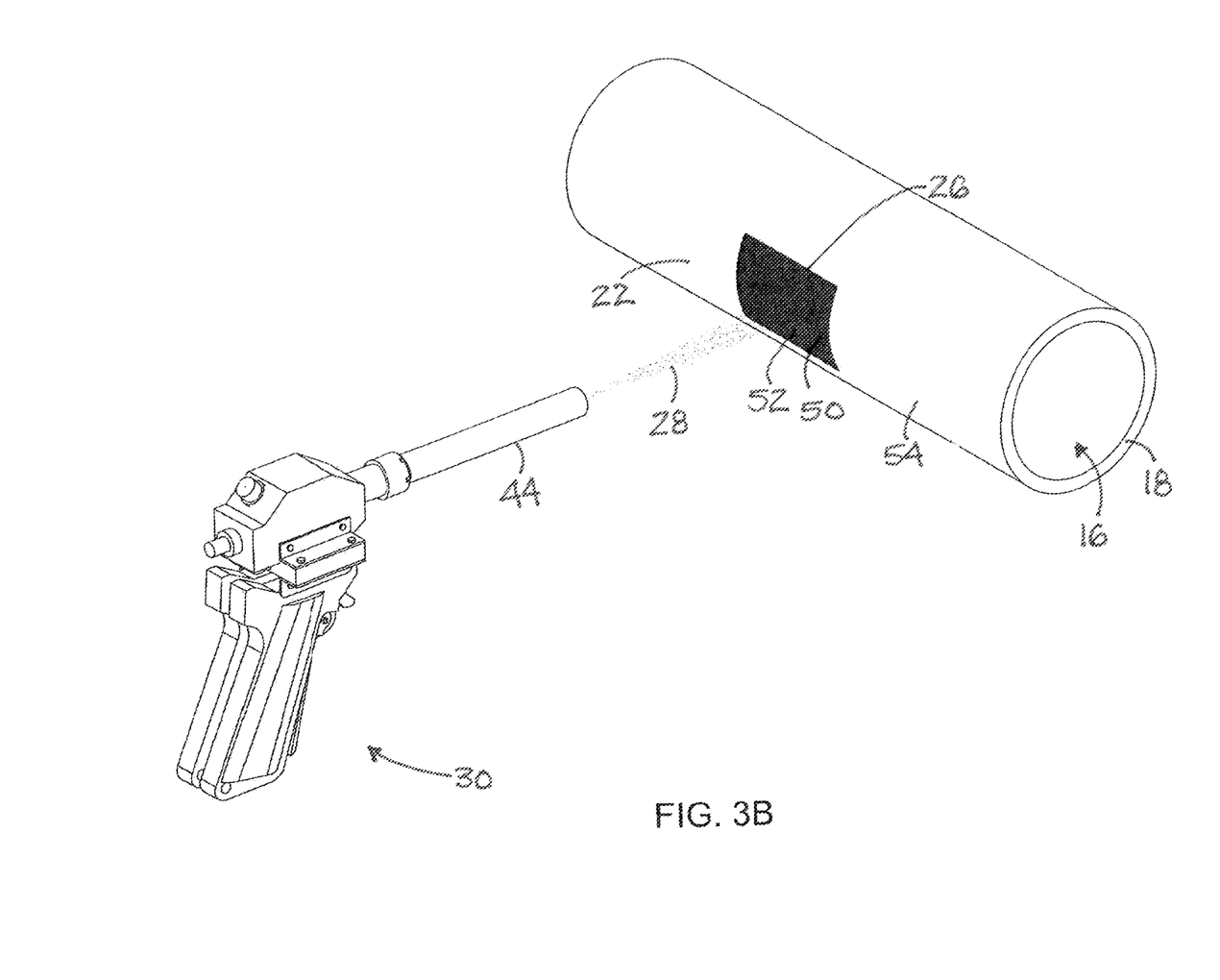
FIG. 3B is a schematic illustration of the nozzle of the cold spray particle deposition apparatus spraying particles of a powder to impact the void of the compromised region of the surface to form a deposit filling at least a portion of the void, according to an illustrative implementation of the disclosure.

The high-energy impact of the particles of the filler material at typically supersonic speeds with the material of the substrate forms a deposit 50 of the particles of the filler materials which become bonded to the substrate 12. The methods may further include moving the area of impact of the particles with the substrate on the surface, such as moving the area of impact in a linear manner with respect to the substrate or in a circular manner on the substrate, and thus may extend the area of the surface 14 covered by the deposit 50 of material. The application of the cold sprayed particles of the filler material may be continued until a desired or optimal thickness of the deposit 50 is achieved. The deposit may have a deposit surface 52 which may restore the profile of the substrate to an optimal profile, which may correspond to the original profile of the surface of the substrate prior to the presence of the defect or damage of the substrate.

Figure 4:
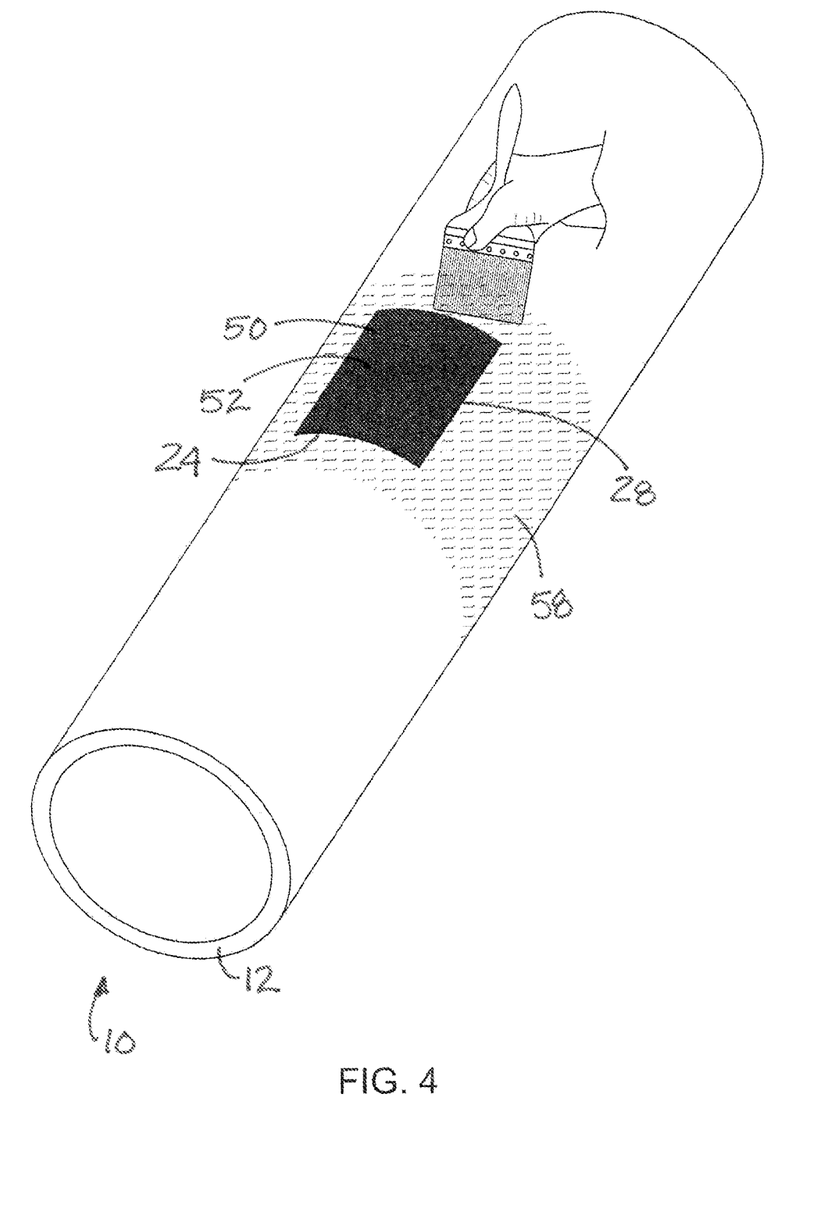
FIG. 4 is a schematic perspective illustration of the application of an anticorrosion coating over the deposited filler material on the compromised region of the surface to prepare for wrapping of the pipe portion with layer or layers of wrap material, according to an illustrative implementation of the disclosure.

Further aspects of the method may include performing any further treatments or preparations of the surface of the substrate and the deposit surface 52 of the deposit 50 that facilitate or improve the bond or adhesion of subsequently applied layers of wrap material to the surfaces 14 and 52. For example, the further treatment of the surfaces 14, 52 may include applying an anti-corrosion coating 58 to the surfaces. Other surface treatments may also be applied or performed.

Figure 5:
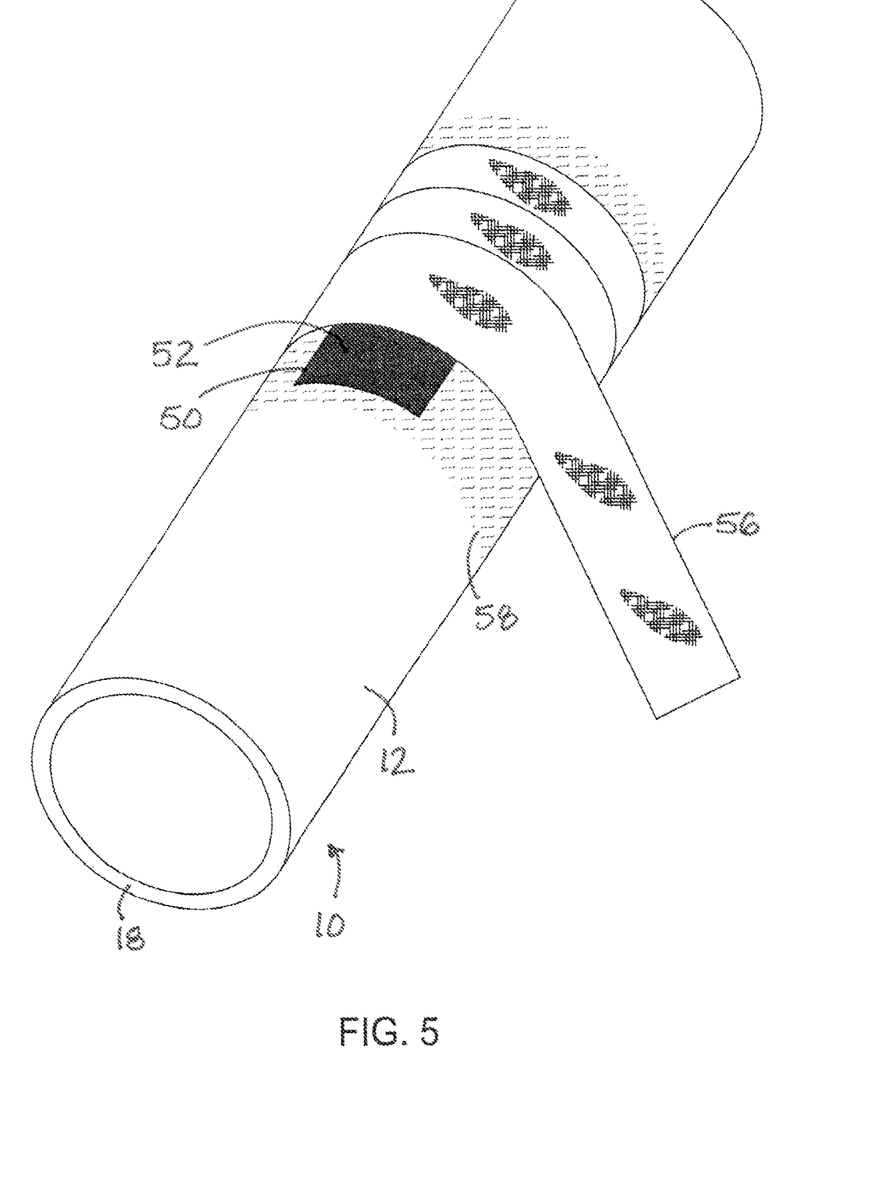
FIG. 5 is a schematic perspective illustration of the compromised portion of the pipe being wrapped with a wrap material to cover the deposit of the filler material on the compromised region of the surface of the pipe, according to an illustrative implementation of the disclosure.

Methods of the disclosure may further include the wrapping of the substrate 12 of the component, along with the filler material of the deposit 50, with at least one layer of wrap material 56 to cover at least a portion of the filler material on the substrate as well as adjacent portions of the surface 14 of the substrate. The wrap material 56 may be a continuous strip of material which is wrapped about the perimeter wall of the substrate, such as the circumference of the compromise portion 22 of the pipe of a pipeline. The wrap material 56 may be formed of any suitable material for the disclosed purpose, and may comprise a high tensile composite wrap of any form and highly suitable wrap materials will meet the definition of a Composite Laminate under ASME PCC-2 entitled Repair of Pressure Equipment and Piping. The wrap material may form a cured composite laminate that effectively encapsulates the portion of the pipe.

Figure 6:
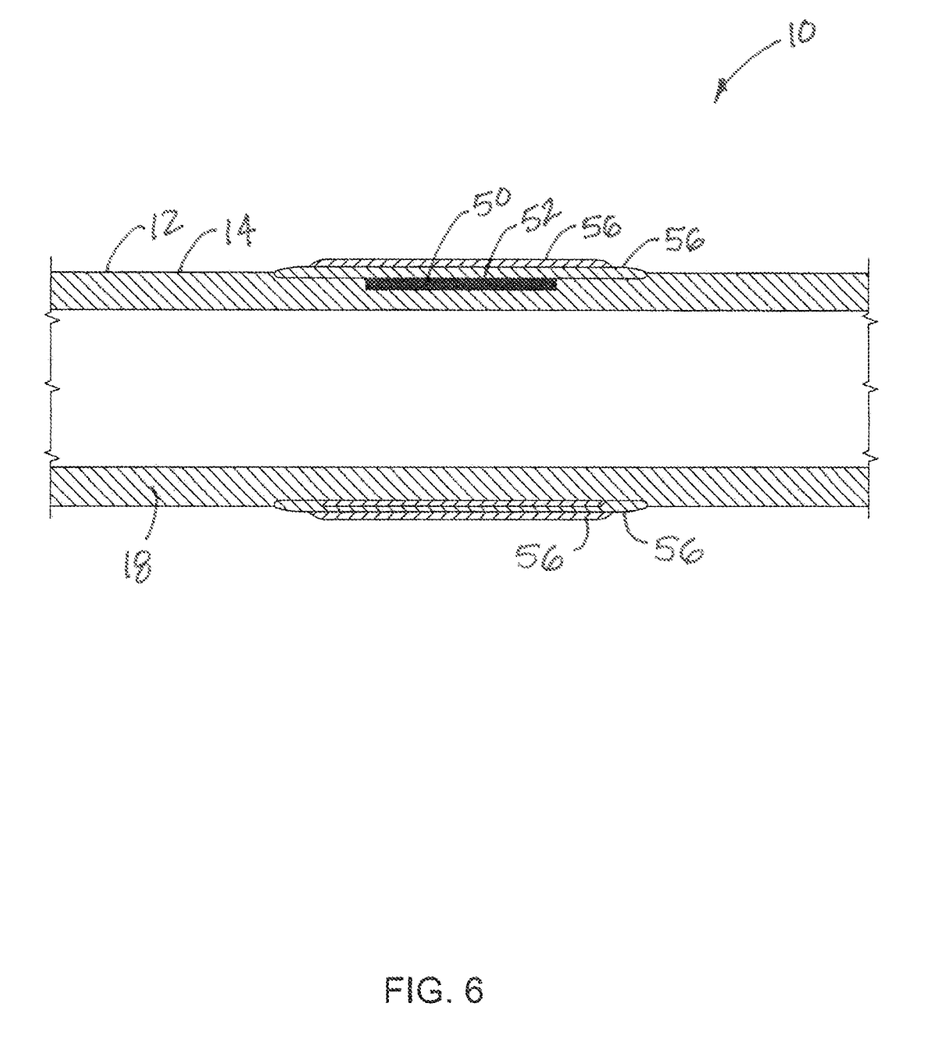
FIG. 6 is a schematic cross-sectional view of a repaired pipe portion having the deposited filler material in the void, the applied anticorrosion coating, and applied layer of wrap material, according to an illustrative implementation of the disclosure.
Figure 7:
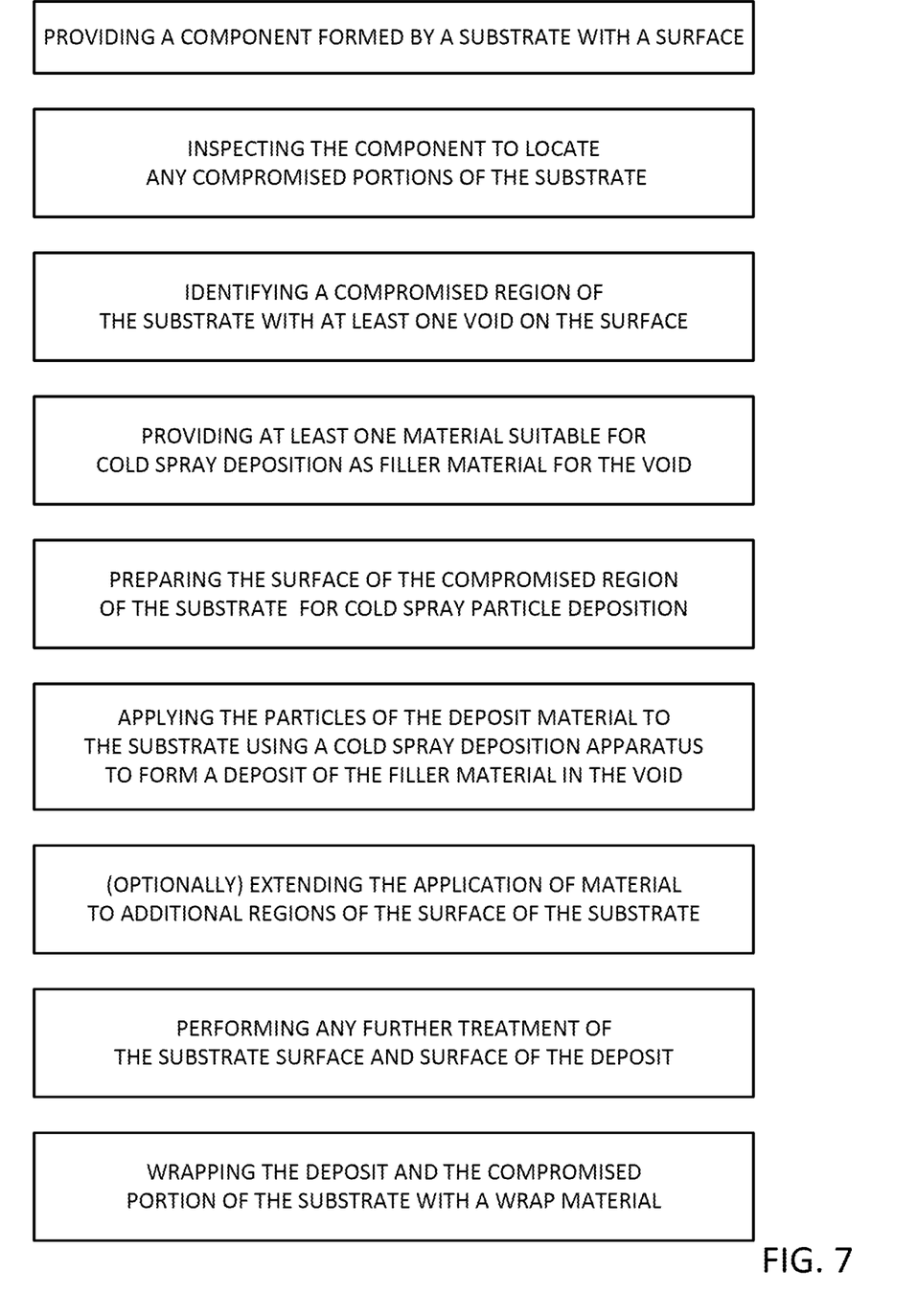
FIG. 7 is a schematic flow diagram of various aspects of an illustrative method of the disclosure.

In some implementations of the methods of the disclosure, application of the particles of the powder of the filler material forming the deposit 50 may be extended to at least one additional region of the surface of the substrate. The additional region of the surface may be characterized by being located on the surface beyond the compromised region of the surface, and typically beyond the area of the surface needed to be covered by the deposit 50 in order to effectuate the repair of the compromised region of the substrate. Illustratively, the additional region of the surface 14 of the substrate may be characterized by being located adjacent to protruding features on the substrate surface, in which the protrusion of the protruding features is determined or measured as compared to a primary region 54 of the surface of the substrate. As an example, the primary region 54 of the surface on a portion of pipe may be substantially cylindrical in shape, and the protruding features protrude or extend from the cylindrical shape. Protruding features on the surface of the component may tend to produce one or more spaces or gaps between the substrate surface 14 and the wrap material 56 when the wrap material is wrapped in tension about the substrate (particularly a surface in which the primary region 58 is substantially circular) and the protruding features, a condition which is sometimes referred to as "tenting." The formation of a deposit of the particles of the filler material adjacent to the protruding features may tend to "fill" or otherwise eliminate such spaces or gaps by providing a smoother transition in the surface between the primary region 54 and the surface of protruding features.

Protruding features on the component may include, for example, one or more welds of the substrate, as circumferential girth welds are typically employed to join together longitudinally arranged portions of pipe. Another example of a protruding feature is one or more seams in the substrate 12 which may be extend longitudinally along the component to join butt edges of a strip of material to form the perimeter wall.

Additionally, the methods of the disclosure may also include inspecting (or re-inspecting) the substrate of the component subsequent to performance of a repair to the compromised portion of the substrate, and detecting or sensing the presence of the filler material at the compromised portion of the substrate which may appear to be indistinguishable from the material of the substrate surrounding the area of the filler material of the repair.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method of providing an inspection detectable repair to a component, the method comprising:
    providing a component to be repaired, the component comprising a substrate having a surface, the component being elongated in a longitudinal direction with a perimeter wall extending longitudinally about a lumen;
    identifying a compromised region of a compromised portion of the substrate of the component, the compromised region having at least one void on the surface and extending into the substrate;
    providing at least one material to form a filler material to be applied to the surface of the substrate to be repaired;
    applying particles of the filler material as a cold spray deposition utilizing a cold spray deposition apparatus, particles of the filler material forming a deposit of cold sprayed particles on the surface of the substrate adjacent to the at least one void; and
    wrapping the substrate of the component with at least one layer of wrap material to cover at least a portion of the deposit of the filler material on the substrate.

2. The method of claim 1 wherein applying the particles of filler material includes continuing to apply the particles of the filler material utilizing the cold spray deposition apparatus until a deposit surface of the filler material deposited on the substrate is restored to a contour substantially equal to an original profile of the surface of the substrate.

3. The method of claim 1 wherein the component comprises a pipe, the perimeter wall being continuous in a lateral cross section.

4. The method of claim 3 wherein the surface comprises an outer surface of the pipe.

5. The method of claim 1 additionally comprising inspecting the component to locate the compromised portion of the substrate utilizing an inspection device configured to detect defects or damage in the perimeter wall of the substrate.

6. The method of claim 5 additionally comprising re-inspecting the component subsequent to the step of applying of the particles to the substrate and subsequent to the step of wrapping the substrate; and sensing the presence of the filler material on the substrate by the inspection device.

7. The method of claim 6 wherein inspecting the component includes moving the inspection device with respect to the substrate.

8. The method of claim 7 wherein inspecting the component includes translating the inspection device in the lumen of the component.

9. The method of claim 1 additionally comprising extending cold spray deposition of the particles of the filler material to at least one additional region of the surface of the substrate, the additional region being characterized by being beyond the compromised region on the surface.

10. The method of claim 9 wherein the additional region is characterized by being located adjacent to protruding features on the surface of the substrate.

11. The method of claim 1 additionally comprising applying an anti-corrosion coating on a deposit surface of the deposit of the filler material and a portion of the surface of the substrate prior to wrapping of the at least one layer of wrap material on the substrate.

12. The method of claim 1 wherein applying particles of the filler material utilizing the cold spray deposition apparatus to form the deposit of cold spray materials on the surface of the substrate adjacent to the at least one void comprises forming the deposit of cold spray particles in the at least one void.

13. A method of providing an inspection detectable repair to a pipe, the method comprising:
    providing a pipe to be repaired, the pipe comprising a substrate having an outer surface, the pipe being elongated in a longitudinal direction with a perimeter wall extending longitudinally about a lumen;
    inspecting the pipe to locate a compromised portion of the substrate utilizing an inspection device configured to detect defects or damage in the perimeter wall of the substrate;
    identifying a compromised region of the outer surface on the compromised portion of the substrate of the pipe, the compromised region having at least one void on the surface and extending into the substrate;
    providing at least one material to form a filler material to be applied to the outer surface of the substrate to be repaired;
    applying particles of the filler material as a cold spray deposition utilizing a cold spray deposition apparatus, particles of the filler material forming a deposit of cold sprayed particles on the outer surface of the substrate adjacent to the at least one void; and
    wrapping the substrate of the pipe with at least one layer of wrap material to cover at least a portion of the deposit of the filler material on the substrate.

14. The method of claim 13 wherein inspecting the pipe includes translating the inspection device in the lumen of the pipe.

15. The method of claim 13 additionally comprising applying an anti-corrosion coating on a deposit surface of the deposit of the filler material and a portion of the outer surface of the substrate prior to wrapping of the at least one layer of wrap material on the substrate.

16. The method of claim 13 wherein applying the particles of filler material includes continuing to apply the particles of the filler material utilizing the cold spray deposition apparatus until a deposit surface of the filler material deposited on the substrate is restored to a contour substantially equal to an original profile of the outer surface of the substrate.

17. The method of claim 13 additionally comprising extending cold spray deposition of the particles of the filler material to at least one additional region of the outer surface of the substrate, the additional region being characterized by being beyond the compromised region on the outer surface.

18. The method of claim 17 wherein the additional region is characterized by being located adjacent to protruding features on the outer surface of the substrate.

19. The method of claim 13 wherein applying particles of the filler material utilizing the cold spray deposition apparatus to form the deposit of cold spray materials on the outer surface of the substrate adjacent to the at least one void comprises forming the deposit of cold spray particles in the at least one void.

20. A repaired component comprising:
- a substrate having a surface, the component being elongated in a longitudinal direction with a perimeter wall extending longitudinally about a lumen, the surface of the substrate having a compromised region with at least one void on the surface and extending into the substrate;
- a deposit on the surface of the substrate adjacent to the at least one void, the deposit comprising a filler material of particles applied to the surface by cold spray deposition utilizing a cold spray deposition apparatus; and
- at least one layer of wrap material covering at least a portion of the deposit of the filler material on the substrate.

21. The component of claim 20 wherein the deposit on the surface of the substrate adjacent to the at least one void comprises filler material particles in the at least one void.

* * * * *